Dec. 4, 1962    F. J. DE MAINE    3,067,358
ELECTRO-EROSION APPARATUS
Filed Nov. 2, 1960

INVENTOR
FRANK J. DE MAINE

BY *G. R. Gugger*

AGENT

United States Patent Office 3,067,358
Patented Dec. 4, 1962

3,067,358
ELECTRO-EROSION APPARATUS
Frank J. De Maine, Johnson City, N.Y., assignor to International Business Machines Corporation, New York, N.Y., a corporation of New York
Filed Nov. 2, 1960, Ser. No. 66,791
5 Claims. (Cl. 313—231)

This invention relates to means for and a method of removing metallic materials as in piercing holes and more particularly to the cutting of electrically conductive metals by electro-erosion.

As is well-known in the machining art, electro-erosion is a method for cutting electrically conductive metals by electrical spark discharges between a negative cathode, which may serve as the cutting tool, and a positive anode, which may serve as the workpiece, while submerged in a dielectric fluid. The sparks are of very short duration and high energy content, the discharges taking place through a fluid having dielectric properties such as kerosene which at all times fills the gap between the spark electrodes. During application of the spark discharges, minute particles of the workpiece are successively dislodged therefrom in the region opposite the active end of the electrode tool to generate the machined contour in the workpiece. As the machining action progresses, it has generally been necessary to maintain the spacing between the workpiece and the electrode tool defining the spark gap at a constant distance by a suitable electrode servo feed mechanism and also to provide suitable means for clearing the spark gap of the machined particles which are removed by each spark. In the latter case, difficulties have been experienced in the past with inadequate clearing away of the machined particles and particularly in the case of the "inside" type of spark machining wherein an electrode tool in an operation similar to boring or drilling remains in the bore as it is progressively formed. It can be readily understood that should the removed particles remain in the spark gap, short circuiting might occur and the sparks might degenerate into conventional heating arcs thereby resulting in improper and inaccurate machining of the workpiece.

Past experience has taught that the dielectric bath itself is insufficient to adequately wash away the machined particles, particularly in an "inside" type of spark machining operation and to overcome this inadequacy the present invention provides a novel and improved means for force flushing the machined particles out of the spark gap. The novel means comprises a cathode tool which is provided with a porous powdered metal tip. The porous tipped cathode is also provided with a hollow chamber which is supplied with dielectric fluid under pressure to permit force flushing of the dielectric fluid through the walls of the cathode thereby rapidly removing the machined metal particles from the gap and maintaining a constant film of dielectric fluid between the cathode and anode throughout the cutting operation. This action also prevents the entrapment of hydrogen gas given off during the cutting operation and which would hinder the cutting operation. A further advantage of the present construction is that the natural filtering action of the sponge-like cathode may be relied on to filter the recirculated dielectric fluid before it is presented to the spark gap.

Accordingly, a principal object of the present invention is to provide an improved method of cutting electrically conductive metals by the electro-erosion process which results in a more accurate machining operation.

A further object of the present invention is to provide a spark machining apparatus having novel and improved means for force flushing the machined particles out of the spark gap.

A still further object of the present invention is to provide in a spark machining apparatus an improved cathode tool which is provided with a porous powdered metal tip to facilitate force flushing of the machined particles.

A still further object of the present invention is to provide an improved spark machining process having means for force flushing dielectric through the walls of the cathode tool.

The foregoing and other objects, features and advantages of the invention will be apparent from the following more particular description of preferred embodiments of the invention, as illustrated in the accompanying drawings.

Figure 1:
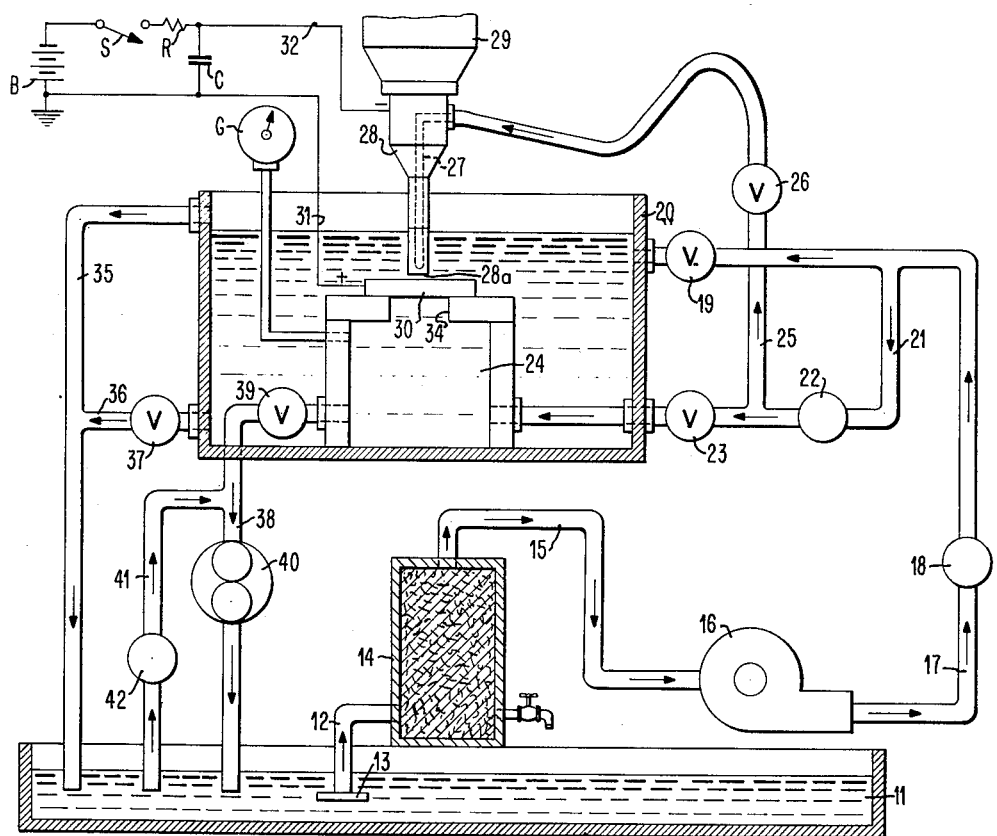
FIG. 1 is a diagrammatic view showing a spark machining system embodying the present invention.

Referring to FIG. 1, there is shown a spark machining system embodying the present invention. It will be understood that use of the present invention is not limited to the particular system shown but that other types of fluid circulating arrangements may be used. The system illustrated comprises a reservoir or storage tank 10 containing a supply of any suitable dielectric fluid 11, such as oil or kerosene. An outlet tube 12 having a screen cap 13 is provided to conduct fluid from the tank and into a filtering unit 14 which filters out metal particles of sub-micro size. The filtered dielectric fluid is conducted from the filtering unit by way of tubing 15 to one side of a motor-pump unit 16 which provides the motive force for circulating the dielectric fluid throughout the system. For example, the motor used may be in the order of one-sixth horsepower for delivering one gallon of fluid per minute at 100 pounds per square inch maximum pressure. From the motor-pump unit the fluid is directed via tubing 17 through an automatic pressure reducing valve 18 which reduces the fluid pressure down to around 25 pounds per square inch. From valve 18 the fluid is directed through a manual control valve 19 and on into a dielectric fluid working tank 20 which, in the illustrated system, has a capacity in the order of 3 gallons. The fluid is also directed through the branch tubing 21, another automatic pressure reducing valve 22 for reducing the fluid pressure to the 2 to 20 pounds per square inch range, and thence through a manual control valve 23 and on into a vacuum chamber 24. The manual valve 23 is provided to meter the fluid going into the vacuum chamber whereby the barometric pressure within the chamber may be regulated to around 10 to 30 inches of mercury. A pressure gage G is provided to give a visual indication of the pressure being maintained in the chamber 24.

The fluid is also directed from the valve 22 through the branch tubing 25 and a manual control valve 26 to a fluid conducting passageway 27 within the improved cathode tool 28, said passageway serving to conduct the dielectric fluid under pressure to the porous metal tip 28a which forms the working end of the tool. The porous tip 28a may be pressureless cast in a mold and sintered from any number of suitable powdered metallic materials such as copper or bronze to a control permeability for metering of the dielectric fluid and filtering of metallic particles. The cathode tool 28 is shown affixed to any well known type of support head 29 suitable for reciprocating the cathode tool through the workpiece 30.

The spark powering circuit, which may be any of known circuits for spark machining, suitably takes the form shown in FIG. 1 in which the storage capacitor is periodically charged from an energy source and discharged across the spark gap defined between the tool 28 and workpiece 30. A direct current energy source is conventionally indicated as a battery B connected through the starting switch S and a charging resistor R to the terminals of the capacitor C. The capacitor is in turn directly connected through low inductance discharge conductors to the spark gap electrodes, the workpiece 30 being connected to the positive terminal through conductor 31 to serve as the gap anode and the tool 28 being connected to the negative terminal through conductor 32 to serve as the gap cathode. In the particular circuit shown, after closing of the switch S the capacitor is charged to a voltage level approaching that of the source B through the charging resistor R. When the voltage becomes high enough to cause a disruptive breakdown of the liquid filled gap, the high spark current flow rapidly discharges the capacitor, causing a very high density discharge current in the electrodes at the spark termini. This process automatically repeats itself at a rate largely controlled by the time constant RC of the charging circuit, where R is the resistance and C is the capacitance.

The workpiece 30 is shown supported by the vacuum chamber 24 and it effectively seals the opening 34 which is provided to receive the cathode tool. The vacuum chamber aids in effective removal of the machines particles which are removed from the workpiece.

The level of dielectric fluid in the fluid working tank 20 is maintained by means of an overflow line 35 which drains any overflow back into the supply tank 10. There is also shown connected to the bottom of the tank 20 another drain line 36 which includes a manual drain valve 37 for draining the tank 20 of fluid prior to setting up of the workpiece. The bottom of the vacuum chamber 24 is connected by way of a suction line 38, which includes a manual shut-off valve 39, to a suction pump and motor unit 40 provided to evacuate the chamber. A fluid line 41 is connected from the supply tank 10 through a pressure control valve 42 to the unit 40 to supply fluid for operating the vacuum pump.

In operation of the system, the various valves are adjusted to prime the system with dielectric fluid, the electrical switch S is closed to effect the supply of current to the electrode 28 and the support head 29 is put into operation to move the electrode adjacent that portion of the metallic workpiece 30 which is to be disintegrated and removed. As is well known, the spark machining action is due to electric field forces associated with the electron current density at the spark anode terminus, each spark removing one or more particles. The spark-over normally occurs across the narrowest portion of the spark gap at any instant, the successive sparks being necessarily time-spaced in order that the spark may preserve its identity as such rather than degenerate into a heating arc. The tank 20 maintains a good supply of dielectric fluid throughout the spark gap which is so essential to a good spark machining operation. As the cathode tool 28 descends under pressure the removed particles are carried away from the spark gap by the circulating dielectric fluid in the tank 20 and as the break-through is made in the workpiece the particles are additionally sucked out of the spark gap and into the vacuum chamber 24.

Figure 2:
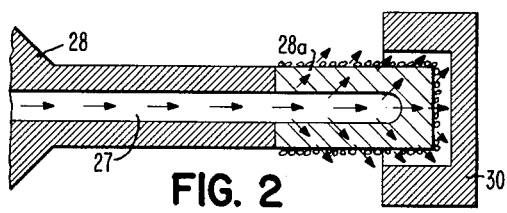
FIG. 2 is a sectional view of a hollow cathode tool having a porous powdered metal tip.

As was previously mentioned, it is extremely important during the machining operation that all of the removed particles be cleared out of the spark gap, otherwise short circuiting will result and the sparks will degenerate into conventional heating arcs. Such effective removal of the particles has presented considerable difficulty particularly with the "inside" type of spark machining, illustrated in FIG. 1, wherein the electrode tool in an operation similar to boring or drilling remains in the bore as it is progressively formed. In keeping with the principles of the present invention, extremely effective removal of the particles has been accomplished by providing the cathode tool 28 with a porous metal tip 28a to which the dielectric fluid is supplied under pressure via the passageway 27. As illustrated in FIG. 2, the utilization of the porous powdered metal tipped cathode will permit force flushing of the dielectric fluid through the walls of the cathode thereby maintaining a constant flow of dielectric fluid between the cathode and anode throughout the cutting operation and continually force flushing the removed particles out of the spark gap. Thus, the molecules of metal are positively prevented from interfering with the discharge of sparks. The porous metal cathode also acts as a filter for the dielectric fluid removing any previously eroded metal which may still be in the fluid as it enters the cathode.

It has been found that the use of the porous tip, in addition to reducing the shorting out of the electrical discharge sparks, also increases the rate of cutting, reduces the spark gap between the cathode and anode by approximately fifty percent over known conventional methods, and improves the surface finish of the anode. The superiority of the porous cathode over the conventional type cathode may be further demonstrated. For example, in cutting a hole in an anode of steel R.C. 40 the use of a solid bronze cathode having a size of .4285 inch produced a hole size of .4295, resulting in an overcut of .0010 inch. However, the use of a porous powdered metal bronze cathode of the same size, .4285 inch, produced in the same steel anode a hole size of .4287 inch, resulting in an overcut of only .0002 inch.

Figure 3:
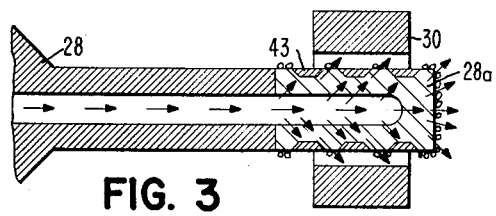
FIG. 3 is a sectional view of a modified hollow cathode tool having a porous powdered metal tip provided with laminations.

Another embodiment of the present improved electrode is shown in FIG. 3. Here the porous powdered metal tip 28a is provided with solid laminations 43 of a dissimilar conductive material. These laminations serve to increase the toughness of the porous cathode and reduce the intensity of cathode erosion.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a spark machining apparatus of the class described wherein means are provided for supplying spark discharges through a dielectric fluid between an electrode tool and a conductive workpiece for removing particles from said workpiece, a reservoir of dielectric fluid, a circulating system connected to said reservoir and including pump means for supplying dielectric fluid under pressure to said apparatus, a porous powdered metal tip affixed to the end of said electrode tool, a fluid conducting passageway extending through said electrode tool and partially into the porous tip thereof, and means for connecting said passageway with said circulating system whereby dielectric fluid is supplied under pressure to said porous tip, said porous tip permitting force flushing of the dielectric fluid therethrough to maintain a constant flow of dielectric fluid between said electrode tool and workpiece throughout the machining operation and to continually force flush the removed particles out of the spark gap between said electrode tool and said workpiece.

2. A spark machining apparatus as defined in claim 1 and including a plurality of solid laminations of conductive material imbedded in the porous tip of said electrode tool, said laminations serving to increase the toughness of said porous tip and to reduce the intensity of erosion of the tip.

3. A spark machining apparatus as defined in claim 1 and including a vacuum chamber having an opening for receiving said electrode tool, means for mounting said workpiece across the opening in said chamber, and support means for moving said electrode tool through the workpiece and into said chamber during the machining operation, said vacuum chamber effectively aiding in the removal of the machined particles.

4. An electrode for use in a spark machining apparatus which comprises an elongated metallic body portion, a hollow fluid conducting passageway extending through said body portion, a porous powdered metal tip affixed to one end of said body portion, and a hollow chamber within said porous tip and communicating with said fluid conducting passageway.

5. An electrode for use in a spark machining apparatus as defined in claim 4 and including a plurality of solid laminations of conductive material imbedded in said porous tip.

References Cited in the file of this patent

UNITED STATES PATENTS

| | | |
|---|---|---|
| 2,052,796 | Rava | Sept. 1, 1936 |
| 2,785,279 | Williams | Mar. 12, 1957 |
| 2,909,641 | Kucyn | Oct. 20, 1959 |